United States Patent Office 2,950,301
Patented Aug. 23, 1960

2,950,301

PREPARATION OF ORGANOTIN AND LEAD COMPOUNDS

James M. Riddle, Baton Rouge, La., assignor to Ethyl Corporation, New York, N.Y., a corporation of Delaware No Drawing. Filed May 1, 1959, Ser. No. 810,239

6 Claims. (Cl. 260—429.7)

The present invention is concerned with the preparation of organometallic compounds, particularly those of the metals lead and tin.

There are many techniques disclosed in the literature for the preparation of various organometallic compounds, including those of lead and tin. For example, typical among the processes for producing organolead or organotin compounds are the reaction of the metals themselves, or alloys thereof, with organic halides, and the reaction of salts thereof, particularly the halides with certain organmetallic compounds, especially the Grignard reagent. Of the many diverse methods for preparing these compounds, tetraethyllead is by far the only product produced in appreciable commercial amounts. While the commercial process involving the reaction of a sodium lead alloy with ethyl chloride has been in operation for over 30 years and is quite satisfactory, it is still not without certain disadvantages. For example, inherent in the process is that a maximum of 25 percent of the lead initially reacted is converted to tetraethyllead. Further, the handling of ethyl chloride requires comparatively cautious and close controls. While the process has been considerably improved in many respects through the years, it is still desirable to provide new processes which would overcome the above and other disadvantages of the present commercial process.

More recently there has been disclosed processes which are of particular advantage over the present commercial process for making organolead compounds involving the reaction of certain lead salts and oxides with particular organometallics. While these new developments have considerably advanced the art of preparation of organometallic compounds, particularly the alkyllead compounds, it is still desirable to find new and improved processes for the production of such compounds which will further simplify the techniques involved, and provide the art with alternate and more economical procedures.

An object of this invention is to provide a new and novel process for the production of organotin and lead compounds. Another object of this invention is to provide a process for the production of organolead and tin compounds in high yield and purity and more economically. A still further object of this invention is to provide a process wherein such compounds are prepared by a more simplified procedure than heretofore employed while still obtaining high yields and purity of the product. These and other objects will be evident as the discussion proceeds.

The process of this invention comprises the reaction of a compound of lead or tin with a trialkyl- or trialkenyl-borane in the presence of water. The lead and tin compounds can be inorganic or organic salts or oxides. The lead halides, particularly lead chloride, and lead oxides are preferred, as are the lower trialkylborane compounds, especially triethylborane. While the process is adaptable to operation at various temperatures, particular advantage is achieved when the reaction is conducted at a temperature between about 20 to 100° C. Still further advantage is achieved when the reaction is conducted in the presence of at least a minor amount of a metal hydroxide, especially sodium hydroxide. The amount of water present in the system is usually sufficient to result in a fluid system. Thus, one embodiment of this invention comprises the reaction of lead oxide with triethylborane at a temperature between about 20 to 100° C. in the presence of water. A still more preferred embodiment of the invention comprises reacting lead oxide with triethylborane at a temperature between about 20 to 100° C. in the presence of sufficient water to provide a fluid reaction system and in the further presence of at least a minor amount of sodium hydroxide.

The present invention has many advantages over the prior art techniques for producing organolead and tin compounds. For example, in the production of these compounds, as much as 50 percent and higher of the lead or tin in the lead or tin compound employed as reactant is convertible to the desired organolead product. Another advantage of the process is that the conditions are less stringent than prior techniques while still resulting in greater yields. A still further advantage of the process is that the products are readily recoverable, in most cases being withdrawn by gravity from the reaction system. Alternatively, the product is readily removed from the system by distillation or steam distillation and easily withdrawn from the water. The former method of recovery is generally preferred. The present process also provides a more economical process than the above and other prior art processes and the present commercial process for producing organolead compounds. These and other advantages will be evident as the discussion proceeds.

As indicated above, in general, any compound of lead or tin which is reactive with organometallic compounds is employable in the process of this invention. Such lead and tin compounds can be generally classed as salts and oxides. The salts include those of both inorganic and organic acids. While organic acids generally are considered as having a carboxylic acid grouping, it is to be understood that organic compounds not having such groupings, but having strongly acidic hydrogen which form salts with lead and tin, are equally applicable as, for example, the alcohols and phenols. Among further criteria of the lead and tin reactants are that they be essentially inert to water or, at most, only form hydrated systems. Thus, among the lead and tin reactants are included their salts of inorganic acids as, for example, the lead and tin halides, including the chlorides, bromides, iodides, and fluorides, and lead sulfide. Other salts of inorganic acids are those which can be termed as salts of complex inorganic acids containing a chalkogen, namely oxygen or sulphur. By the term complex inorganic acid is intended those inorganic acids which contain at least one of the elements oxygen or sulphur in the anion and additionally contain therein another and different element of the groups III through VI of the periodic chart of the elements capable of forming complex ions with oxygen or sulphur. The non-metallic elements capable of forming complex ions with oxygen or sulphur of the groups III–A, IV–A, V–A and VI–A are particularly preferred. Such include boron, carbon, nitrogen, silicon, phosphorous, arsenic, selenium, and tellurium. Included among the preferred anions of the complex inorganic acids are those wherein both oxygen and sulphur comprise the anion, e.g. the sulfate anion. Thus, typical examples of such salts include the lead and tin sulfates, sulphonates, sulphinates, carbonates, nitrates, phosphates (both ortho and meta), pyrophosphates, persulphates, silicates, cyanates, thiocyanates, dithionate, borates (both ortho and meta), selenates, the various arsenates, and the like. Other lead and tin salts which can be employed but are less peferable include, for example, those in which the anion comprises, in addition to the oxygen or sulphur, certain metals such as those of groups III–B through VI–B and III–A through V–A, for example, lead antimonate, tungstate, chromate, zirconate, molybdate, and the like.

Typical examples of the oxides employable in the process include lead suboxide, lead monoxide, red lead, lead dioxide, and the ores themselves, e.g. litharge, and massicotite, and analogous oxides of tin.

The salts of the organic acids can be further defined as such wherein the lead or tin is attached to at least one carbon-containing organic radical through an intermediate atom of oxygen or sulphur. For practical reasons, the hydrocarbon portions of such acids will generally contain not more than about 25 carbon atoms, even though higher molecular weight materials can be employed. Illustrative examples of the lead and tin salts of organic acids include lead formate, lead acetate, lead propanoate, lead butanoate, lead octanoate, lead myristate, lead octadecanoate, lead linoleoate, lead butyrate, lead ethylate, lead phenolate, lead benzoate, lead thiophenolate, lead naphthenate, lead thioacetate, lead isobutyrate, lead propiolate, and the like and corresponding compounds of tin. It is to be understood that the hydrocarbon portions of such organic acid salts can be further substituted to result in branched chain isomers or substituted with functional groups such as the halogens, keto, and the like groups, provided such are essentially inert in the reaction. The lead and tin salts, particularly the lead salts, of the lower alkanoic acids, especially those having up to about 8 carbon atoms in the hydrocarbon portions, are preferred salts of organic acids because of their greater availability, economy, solubility in the reaction system, and higher yields obtained.

The above grouping of the tin and lead compounds is not intended to indicate that the various classes or members of the classes are equivalent-type materials since some exhibit particular and unique advantage over others. For example, among the preferred lead and tin reactants employed are those which are completely miscible in the reaction system. Of the lead halides, lead chloride comprises a preferred embodiment. Of the lead salts of complex inorganic acids, lead sulfate comprises a preferred embodiment and of the lead salts of organic acids, those of the lower alkanoic acids having up to about 8 carbon atoms in the hydrocarbon portion, especially lead diacetate, are preferred. Lead chloride is preferred over the lead salts of organic acids and the salts of complex inorganic acids since higher yields are obtained. On the other hand, the lead oxides, particularly lead monoxide, is an especially preferred embodiment even though it is not completely miscible in the reaction system because of its greater availability, ready reactivity, and the high yields which are obtained. Likewise, the aforementioned lead compounds are preferred over the tin compounds because of their greater utility in the process and the more advantageous use to which the products obtained are applicable.

The organoborane compounds employed in the process are the trialkyl- or trialkenylboranes. In general, such compounds will contain up to and including about 18 carbon atoms in each hydrocarbon portion although higher carbon atom materials are applicable. Illustrative examples of the alkyl- and alkenylboranes are trimethylborane, triethylborane, tripropylborane, trihexylborane, trioctylborane, tridecylborane, tridodecylborane, trioctadecylborane, trivinylborane, tri-1-propenylborane, tri-2-butenylborane, tri-1-hexenylborane, tri-1-octenylborane, tri-1-octadecenylborane, tri-2,4-octadecadienylborane and the like. It is to be understood that the hydrocarbon portions of such compounds can be branched chain and further substituted with functional groups which are essentially inert in the reaction, such as the halogens, acid functions, carbonyl and the like. The trialkyl- and trialkenylboranes of the lower alkyl and alkenyl radicals, that is, having up to and including about 8 carbon atoms in each of such groups, are preferred because of their greater availability and reactivity in the process. The trialkylboranes having up to and including about 8 carbon atoms in each alkyl group are more especially preferred, particularly triethylborane, because of easier handling and greater availability.

The proportions of the reactants can be varied over a considerable range to still result in the desired organolead or tin compound. It is preferable, however, to employ at least the stoichiometric amount of the alkyl- or alkenylborane compound. Advantage is achieved in higher yields and faster reaction rates when a molar excess between about 5 to 15 percent of the alkyl- or alkenylborane is employed. In determining the stoichiometry, one can base it upon the consumption of one or all of the alkyl or alkenyl groups in the trialkyl- and trialkenylboranes. Since faster reaction is obtained of the first alkyl or alkenyl group of the organoborane compound, a particular embodiment of the invention comprises employing the above stoichiometric portions based upon reaction of only one alkyl group per molecule of the alkyl- or alkenylborane. The water employed in the system is usually provided in amount to result in a fluid reaction mixture. It is also desirable to employ at least 3 moles of water per mole of alkyl- or alkenylborane. In a preferred embodiment, between about 5 to 200 moles of water per mole of the alkyl- or alkenylborane is employed.

The process is subject to relatively simple manipulative operations. In general, the requisite amounts of organoborane compound and water are added to a reactor and then the lead or tin compound is added thereto. The reverse mode of addition is equally applicable although higher yields are obtained when adding the lead or tin compound to the organoborane. The mixture is then agitated to facilitate contact of the reactants. During the addition and reaction, an inert atmosphere is preferably employed because of the flamability of the organoborane compound. The mixture is reacted at the desired temperature and then, or during the course of the reaction, the product can be withdrawn in essentially pure form from the bottom of the reactor, in those instances wherein the product is of appropriate specific gravity, or, alternatively, the product is readily distillable from the reaction mixture in pure form. It is to be understood that other variations in the process can be made without departing from the purposes of the present invention.

The process will be more completely understood from a consideration of the following examples wherein all parts are by weight unless otherwise specified.

*Example I*

Into a reactor equipped with internal agitation, external heating means, a means for maintaining a nitrogen atmosphere, and a reflux condenser, was added 7.85 parts of lead monoxide and 250 parts of water. Then the reaction mixture was heated to 75° C. and 6.86 parts of triethylborane was slowly added to the reactor over a period of 15 minutes. The reaction mixture was stirred for a total of 1¼ hours while maintaining the temperature at 70 to 75° C., whereby the mixture turned from an orange color to a dark green color. Then 20 parts of 2,2,5-trimethylhexane were added to extract the organometallic materials present. The water layer was withdrawn. The organic layer was filtered to remove solids including finely divided lead metal by-product. The filtrate was subjected to distillation at 220 mm. pressure and 55 to 65° C. to remove any unreacted triethylborane. Tetraethyllead remaining in solution in the hexane was obtained in a high yield.

*Example II*

Example I is repeated with exception that 15 parts of sodium hydroxide are added to the reaction mixture and at the completion of the reaction, the tetraethyllead product is withdrawn by gravity from the reaction system without extraction with the hexane. In this manner, an enhancement in recovery and yield of tetraethyllead is obtained over that when sodium hydroxide is not present.

*Example III*

Example II is repeated with exception that an equivalent amount of lead chloride is substituted for the lead oxide. Tetraethyllead is obtained in high yield.

*Example IV*

When Example II is repeated substituting an equivalent amount of lead diacetate, tetraethyllead is obtained in high yield.

*Example V*

When 30 parts of lead phenolate are reacted with 27.6 parts of trivinylborane in the presence of 250 parts of water and 10 parts of potassium hydroxide at 50° C. for 2 hours, tetravinyllead is obtained in high yield.

*Example VI*

Tetraoctyllead is obtained when 30.3 parts of lead sulfate are reacted with 38.5 parts of trioctylborane in the presence of 500 parts of water and 20 parts of sodium hydroxide at the reflux temperature for 1 hour.

*Example VII*

Employing the procedure of Example II, 86 parts of lead naphthenate are reacted with 60 parts of tri-1-hexenylborane in the presence of 300 parts of water and 3.7 parts of calcium hydroxide at 80° C. for 2 hours. Tetra-1-hexenyllead is obtained in high yield.

*Example VIII*

When 60 parts of lead sulfide are reacted with 399 parts of trioctadecylborane at 65° C. in the presence of 1000 parts of water and 5.6 parts of lithium hydroxide, tetraoctadecyllead is obtained in high yield.

*Example IX*

Employing the reactor of Example I, 13.5 parts of stannous oxide in 100 parts of water are added to the reactor and then 1 part of sodium hydroxide is added thereto. The reaction mixture is heated to 75° C. and agitation is commenced. Then 11.0 parts of triethylborane are added thereto. The mixture is stirred for a total period of 3 hours. Ethyltin product is obtained in high yield.

The above examples are presented by way of illustration and the invention is not intended to be limited thereto. It will be evident that other reactants described hereinbefore can be substituted in the above examples to produce the corresponding organotin and lead products. For example, in Example III, one can substitute lead bromide or iodide, in Examples IV, V, or VIII, one can substitute lead or tin benzoate, octanoate, 1-octenoate, ethylate, thiophenolate, propiolate, and the like, and in Example VI, one can substitute the lead and tin nitrates, cyanates, thiocyanates, phosphates, chlorates, perchlorates, sulfites, arsonates, boronates, and the like.

As indicated, advantage is achieved by incorporating a base in the reaction mixture. The incorporation of such materials in the reaction mixture consistently results in enhancing the yields obtained and more effective separation of the product. For this purpose, the alkali and alkaline earth hydroxides are quite well suited as, for example, sodium hydroxide, potassium hydroxide, lithium hydroxide, magnesium hydroxide, calcium hydroxide, strontium hydroxide, and the like. The hydroxide need be added only in minor amount to result in a slight basicity of the reaction mixture. Generally, such materials are preferably added in amount between about 0.1 to 3 moles hydroxide ion per mole of the lead or tin reactant.

The temperature at which the reaction is conducted is subject to considerable latitude, but generally is between about 0° C. to the decomposition temperature of the reactants or products. For practical reasons, the reaction is ordinarily conducted at between about 0 to 100° C. Best results are obtained, however, when the temperature is maintained between 20 to 100° C. There is no need to employ pressure in the operation unless one desires to conduct the reaction at a temperature above the boiling point of the reaction mixture. Reduced pressures can be employed if it is desired to steam distill the product as, for example, when it is lower boiling than the organoborane reactant.

While some of the lead and tin reactants are insoluble in the reaction mixture, they are still employable, although less preferred. When employing such insoluble reactants, it is preferable that they be in a finely divided form as, for example, below about 1/16" in major dimension. Such facilitates easier handling and more intimate contact of the reactants. Such forms of this reactant are readily obtainable commercially or obtained by mechanical sub-division, such as grinding and the like, if necessary.

In order to minimize flamability of the organoborane reactant, the reaction is generally conducted in an inert atmosphere. For this purpose, the usual rare gases are quite applicable as, for example, neon, nitrogen, argon, krypton, and the like.

The length of time of conducting the reaction is subject to considerable latitude in some instances being essentially complete merely upon mixing the reactants and in other instances taking place usually within about 10 hours for practical purposes. In a preferred embodiment, the reaction is conducted over a period between about 1 hour to 5 hours. It will be evident that the process is readily adaptable to continuous operation merely by providing a stream of the tin or lead compound to co-mingle with a stream of the trialkyl- or trialkenylborane, water, and metal hydroxide, if employed, with continuous withdrawal of the product organotin or lead from the reaction system.

The products produced according to the process of this invention are of considerable and well-known utility. For example, the organolead compounds, especially tetraethyllead, are useful as additives to motor fuels in order to enhance their antiknock quality. The organotin compounds are useful as biocides, preservatives, in forming fiber coatings, as plasticizers, and the like. These and other uses of the products will be evident.

Having thus described the process of this invention, it is not intended that it be limited except as set forth in the the following claims.

I claim:

1. A process for the manufacture of an organometallic compound of a metal selected from the group consisting of lead and tin which comprises reacting a compound selected from the group consisting of lead and tin salts and oxides which are essentially inert to water with an organoborane compound selected from the group consisting of trialkylborane and trialkenylborane in the presence of water.

2. The process of claim 1 wherein said tin compound is stannous oxide.

3. The process of claim 1 wherein said lead compound is lead oxide and said organoborane is a trialkylborane.

4. Process of claim 3 further characterized in that the reaction is conducted at a temperature of 20 to 100° C.

5. Process of claim 4 further characterized in that the reaction is conducted in the further presence of a hydroxide selected from the group consisting of alkali and alkaline earth metal hydroxides.

6. A process for the manufacture of teraethyllead which comprises reacting lead oxide with triethylborane at a temperature between about 20 to 100° C. in the presence of water and in the further presence of sodium hydroxide.

References Cited in the file of this patent

Chemical Reviews, vol. 54, October 1954, pp. 875 to 890.